United States Patent [19]
Metz et al.

[11] 4,176,069
[45] Nov. 27, 1979

[54] DEVICE FOR EXCHANGING SUBSTANCES AND METHOD OF MANUFACTURING THE DEVICE

[75] Inventors: Hellmut Metz; Henning Kage, both of Wedel, Fed. Rep. of Germany

[73] Assignee: Licentia Patent-Verwaltungs-G.m.b.H., Fed. Rep. of Germany

[21] Appl. No.: 799,518

[22] Filed: May 23, 1977
(Under 37 CFR 1.47)

[30] Foreign Application Priority Data

May 21, 1976 [DE] Fed. Rep. of Germany ....... 2622684

[51] Int. Cl.² .......................................... B01D 31/00
[52] U.S. Cl. ................................. 210/321 B; 55/158; 422/48
[58] Field of Search ............. 210/321, 500 M; 55/158; 23/258.5 M

[56] References Cited

U.S. PATENT DOCUMENTS

| | | | |
|---|---|---|---|
| 2,982,416 | 5/1961 | Bell | 210/321 |
| 3,684,097 | 8/1972 | Mathewson, Jr. et al. | 210/321 B |
| 3,739,553 | 6/1973 | Aine | 55/158 |
| 3,746,175 | 7/1973 | Markley | 210/500 M X |
| 3,764,018 | 10/1973 | Shaw et al. | 210/500 M |
| 4,075,091 | 2/1978 | Bellhouse | 210/321 B X |
| 4,075,092 | 2/1978 | White et al. | 210/321 B X |

Primary Examiner—Frank A. Spear, Jr.
Attorney, Agent, or Firm—McGlew and Tuttle

[57] ABSTRACT

A device for exchanging substances, in particular, an oxygenator or dialyzer, comprises a stack of semipermeable membranes each having a plurality of longitudinally oriented capillaries embedded therein which open at each end. A porous tissue mass is disposed between adjacent membranes and define transverse gas flow paths therethrough from one side of said stack to the opposite side. A non-porous member closes off the top and the bottom of the stack and each longitudinal end of the tissue mass between adjacent membranes. A connecting piece is arranged at each end of the stack to provide for a flow path, for example, for blood, into the capillaries of each membrane and a similar connecting piece is arranged at the opposite end for the off-flow of the blood. Connecting pieces are arranged at each side for the inflow of a gas, for example, oxygen, into the tissues and for the outflow of the gas on the opposite side of the stack. The gas will diffuse through the tissues and the interspaces of the membranes and due to the partial differential pressure, carbon dioxide will diffuse from the blood space into the gas space. The membranes may be designed with any selective permeability in accordance with the substances to be transferred for use as a dialyzer or ureal substances, a dialyzate is directed through the gas space.

6 Claims, 3 Drawing Figures

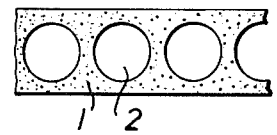
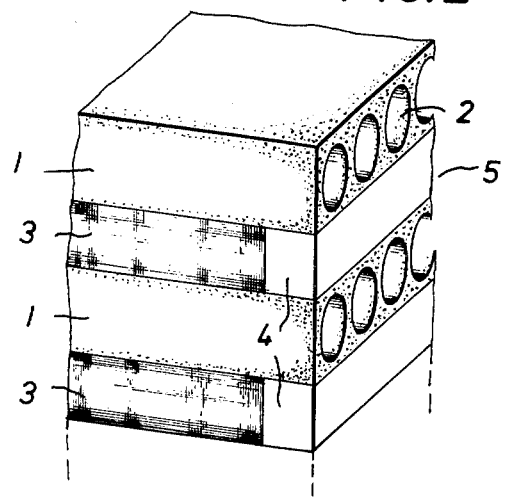
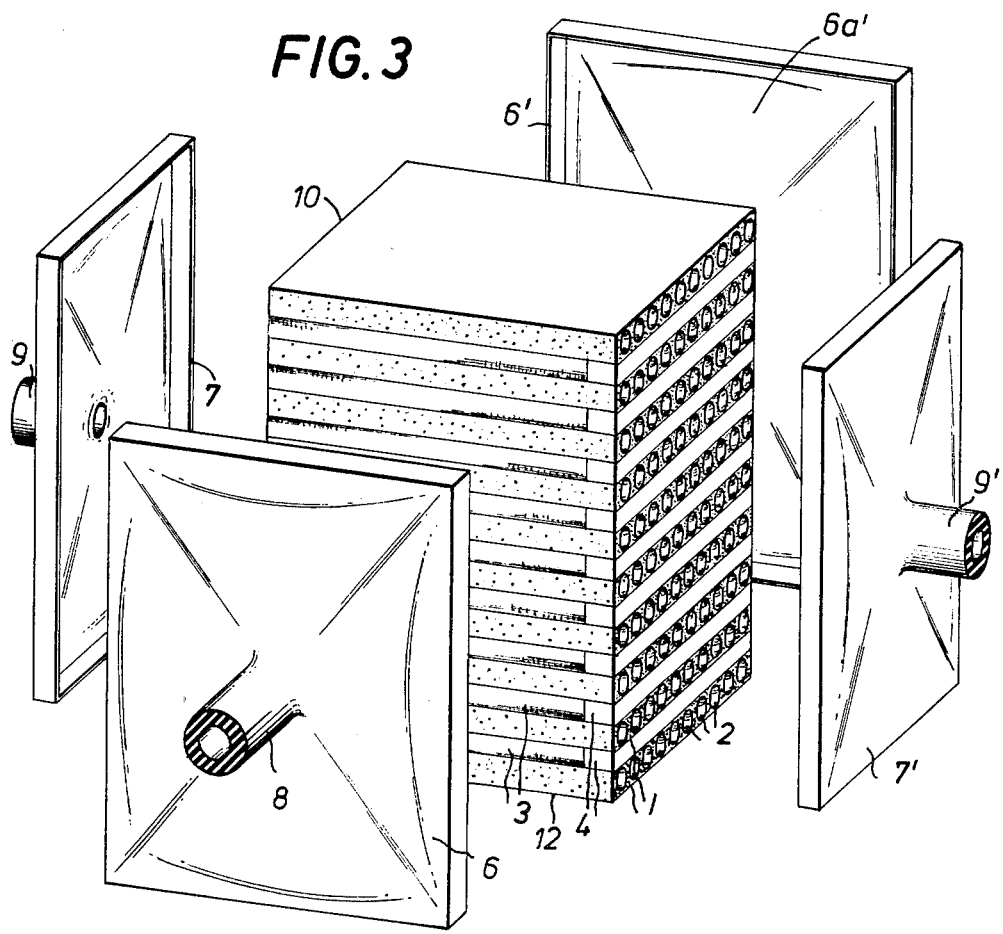

DEVICE FOR EXCHANGING SUBSTANCES AND METHOD OF MANUFACTURING THE DEVICE

FIELD AND BACKGROUND OF THE INVENTION

This intention relates in general to the construction of devices for exchanging substances and to a method of making such devices and, in particular, to a new and useful oxygenator or dialyzer which is madeup of a stack of semipermeable membranes having capillaries and porous tissues alternately arranged.

DESCRIPTION OF THE PRIOR ART

The present invention relates to a device for exchanging substances, particularly, an oxygenator or dialyzer, comprising a casing and a stack of semipermeable membranes.

Such devices are well known and serve the purpose of simulating the basic function of the lungs or the kidneys. The two phases are separated from each other within the device by a membrane, the permeative selectivity of which largely satisfies the required transfer of the substances. A satisfactory mechanical resistance and physiological compatibility are further requirements imposed on the membrane. Suitable membrane materials are preferably silicones, some silicone copolymerides, expanded PTFE, etc.

From the point of view of their constructional features, membrane oxygenators may be classified in four groups. An example of the first group is the diffusion cell disclosed in German Pat. No. 2,238,708. In this construction, simple webs are used as spacers for the membranes and the very long foil strip is pleated in concertina fashion. The gas spaces are also produced by webs which are successively introduced from below into the forming folds. The blood film thickness, as well as the circulation or mixing, largely depends on the nature of the web employed. In operation, the entire system is braced from the outside against the blood pressure by metal plates for reasons of stability.

In another group, thin capillaries are produced by pressing profiled plates from the outside on silicone membranes. Such a device is described in German Offenlegungsschrift No. 2,406,077. The main difficulty of such a construction is the property of silicones called "sticking effect". Because of strong adhesive forces, the membranes tend to adhere to each other so strongly that they are difficult to separate. It is therefore necessary, in such oxygenators, to dust the blood spaces with a salt which must be washed out again prior to starting the perfusion. In practice, the removal of the salt involves great difficulties. Also, the cross-sections of the capillaries, which are most desirable are seldom obtained.

In a third group of membrane oxygenators, the spacers are integrated with the membrane. This may take the form of unilaterally provided small elevations, for example, ball knubs. Such a system again must be braced from the outside.

A fourth group includes the so-called tubular oxygenators. In this construction, spacers and powdering with salt are avoided by providing the blood space in the form of a flexible tube. In the most simple design by Bodell, a thin, long, flexible tube is placed in a tub through which oxygen is conducted, and the venous blood is directed through the tube. It has been found, however, that even if secondary currents are produced in the tube by a periodic variation of the diameter or by spiral winding, the effect of the oxygenation is not satisfactory.

SUMMARY OF THE INVENTION

The present invention is directed to a device which avoids the drawbacks of the oxygenators of the prior art and facilitates a more accurate simulation of the gas exchange to the processes taking place in natural lungs.

In accordance with the invention, the membranes are provided with a plurality of capillaries which extend parallel to each other and are separated from each other by porous tissues, and at the ends of the capillaries, on either side, the membranes are connected to each other and to a connecting piece. The spaces between the membranes filled out with the porous tissue, form the gas spaces. The connecting seam at the ends of the capillaries separates the gas space formed by the tissue, from the blood space.

According to the method of the invention, the membranes of the inventive construction are manufactured by extruding a silicone rubber base plastic. It is also possible to form the capillary membranes so that thin, flat, foils are adhesive-bonded together, with a plurality of parallel, stretched, thin wires embedded in the adhesive. After curing of the adhesive, the wires are removed, whereby the capillaries are formed. Further, a capillary membrane may be produced by dipping a suitably shaped part, with the aid of an appropriate tool, into a solution of a plastic.

The substantial advantage of the inventive device is that the blood streams take an arteriolar shape without forming sharp edges or dead water areas, not even with a pulsating flow, which is due to the cross-section of the capillary foils. The pulsation may be produced by a pulsating pressure in the gas spaces, It is further possible to reduce the overall size of the device to an extent such that an implantation can be provided.

Accordingly, it is an object of the invention to provide an improved device for exchanging substances, in particular, an oxygenator or dialyzer, which comprises a stack of semipermeable membranes with a plurality of longitudinally oriented capillaries embedded in the membranes and with porous tissue mass disposed between adjacent membranes which define transverse gas flow paths from one side of the stack to the other and which includes connecting pieces at each end of the stack and at each side for the inflow and outflow of the substances to the capillaries and to the gas passages.

A further object of the invention is to provide a method of forming a device for exchanging substances, which comprises forming individual membranes of a semipermeable material and forming capillary passages through the membranes from one end to the other and thereafter assembling the membranes in a stack with alternate layers of gas-permeable tissue material, forming planar end and side surfaces on the stack, and sealing each end of the tissues between the membranes and thereafter connecting flow connectors to each side and end of the stack to provide for an inflow and outflow of the substances to be exchanged to the capillaries and to the tissues, respectively.

Another object of the invention is to provide a device for exchanging substances which is simple in design, rugged in construction and economical to manufacture.

The various features of novelty which characterize the invention are pointed out with particularity in the claims annexed to and forming a part of this disclosure.

For a better understanding of the invention, its operating advantages and specific objects attained by its uses, reference should be had to the accompanying drawings and descriptive matter in which there is illustrated a preferred embodiment of the invention.

BRIEF DESCRIPTION OF THE DRAWINGS

In the Drawings:

FIG. 1 is a cross-sectional view of a capillary membrane constructed in accordance with the invention;

FIG. 2 is a perspective view of a corner of a block built up of individual membranes; and FIG. 3 is an exploded perspective view of the complete block with the associated connecting pieces.

DESCRIPTION OF THE PREFERRED EMBODIMENT

Referring to the drawings in particular, the invention embodied therein, comprises a device for exchanging substances which in particular has application as an oxygenator or a dialyzer. In accordance with the invention, the device is madeup of a plurality of semipermeable membranes or foils which, for example, may be of a material which is fibrous and permits some permeation of liquids and gases therethrough. The membranes 1 are formed into a stack with wads or masses of tissue 3 arranged in alternate layers in a vertical stack.

Each membrane has a plurality of longitudinally extending capillaries 2 defined therethrough for the passage of a first substance, for example, blood. The tissues are arranged such that they have selective permeability and a substance such as an oxygen is passed therethrough.

In comparison with individual tubes, it is true that the capillary membrane 1, as shown in FIG. 1, reduces the surface contacting the gas. On the other hand, however, this design offers an increased mechanical stability as well as the possibility of providing a smooth and economical connection. The thickness of membrane 1 is about 0.5 mm, and the diameter of a capillary about 0.3 mm.

By superposing individual membranes 1 and placing tissues 3, permeable to gas, therebetween, a stack is built-up, as shown in FIG. 2. The foils are connected to each other by vulcanization or by a bonding agent at their two end portions comprising the outlets of the capillaries, so that spacers 4 are formed which, at the same time, separate the blood spaces (capillaries 2) from the gas spaces (tissue 3), and seal off each end of the gas spaces. By cutting the protruding protions of the vulcanized ends of the membranes, a planar inlet or outlet surface 5 of the capillaries is produced.

FIG. 3 shows the manner in which the connecting pieces 6 and 7 are joined to a finished stack of membranes 1, which are covered at the top and bottom by non-porous members 10 and 12. The operation of the capillary oxygenator thus produced is as follows: Oxygen enters, for example, connecting piece 6, shown in front in FIG. 3 though conduit 8 and into a hollow portion of the block-shaped piece 6 and flows through a gas-permeable tissue 3. The gas leaves the oxygenator through a hollow space 6a' of a connecting piece 6' and flows out through a conduit similarly to conduit 8. The blood to be oxygenized is fed into the oxygenator from the lefthand side through a conduit 9 of a connecting piece 7, and is directed through capillaries 1. The oxygenated blood is removed through connecting piece 7' at the righthand side and flows out through conduit 9' of a connecting piece 7' to further lines.

The material of the foils is highly permeable to respiration gases and has a high permeation ratio of $CO_2$ to $O_2$. It is also physiologically well compatible and resistant to body tissues and liquids.

While the blood flows through capillaries 2, the oxygen diffuses from the interspaces filled out with porous tissue 3 and which form the gas space and into the capillaries and the blood. Due to the partial differential pressure, $CO_2$ diffuses from the blood space into the gas space in the opposite direction.

The inventive oxygenator may also be used for the transfer of other substances into or from the blood. Thus, for example, for hemodialysis, a material is used for the the foils having a selective permeability satisfactory for the substances to be transferred, for example, ureal substances. In such a case, a dialyzate is directed through the gas space of the inventive oxygenator.

While a specific embodiment of the invention has been shown and described in detail to illustrate the application of the principles of the invention, it will be understood that the invention may be embodied otherwise without departing from such principles.

What is claimed is:

1. A device for exchanging first and second substances, in particular an oxygenator or dialyzer, comprising a casing, a stack of alternate layers of semipermeable membrane layers having a plurality of substantially parallel capillary tubes extending therethrough for flow in one direction and porous tissue layers for flow therethrough in a direction transverse to said one direction, spacer means disposed at each end of said tissue confining the flow through the tissues therebetween, said alternate layers being disposed in said casing, first and second connecting pieces connected to respective sides of said casing at respective sides of said stack having a first inlet conduit at one end of said tubes for the flow of the first substance to said capillary tube and a first outflow conduit at the opposite end of said casing and said tubes for the flow of the first substance out of said capillary tubes, and first and second connecting pieces connected to respective ends of said casing and said tissue layers having a second inflow conduit for the inflow of the second substance into said porous tissues and a second outflow conduit for the outflow of the second substance out the other end of said porous tissues.

2. A device for exchanging substances, in particular, on oxygenator or a dialyzer, comprising a stack of semipermeable membranes, a plurality of longitudinally oriented capillaries embedded in each of said membranes, a porous tissue mass disposed between adjacent membranes and defining transverse gas flow paths therethrough from one side of said stack to the opposite side thereof, a non-porous member closing off the top and bottom of said stack and each longitudinal end of said tissue mass between adjacent membranes, first and second connecting pieces at respective ends of said stack defining inflow paths to said capillaries at one longitudinal end of said stack and defining an outflow path from said capillaries at an opposite longitudinal end of said stack, third and fourth connecting pieces at each side of said stack defining inflow paths to said tissue masses at one side of said stack and defining an outflow path from said tissue masses at the opposite side of said stack.

3. A device for exchanging substances, according to claim 2, wherein said tissue masses form porous elements for the passage of gas and dialyzate.

4. A device for exchanging substances, according to claim 2, wherein each side and end of said stack is planar, said first and second and third and fourth connecting pieces comrising block-shaped members engageable against a respective planar end surface and having a central conduit extending outwardly therefrom.

5. A device for exchanging substances, according to claim 2, wherein said non-porous member between said membranes and said porous mass at each end of said stack comprise spacers between said membranes.

6. A device for exchanging substances, according to claim 5, wherein said spacers are produced by vulcanization or adhesive bonding.

* * * * *